D. F. CULLEN & G. T. MARTIN.
CRACKER RECEPTACLE.
APPLICATION FILED APR. 2, 1917.
1,280,413.
Patented Oct. 1, 1918.
2 SHEETS—SHEET 1.
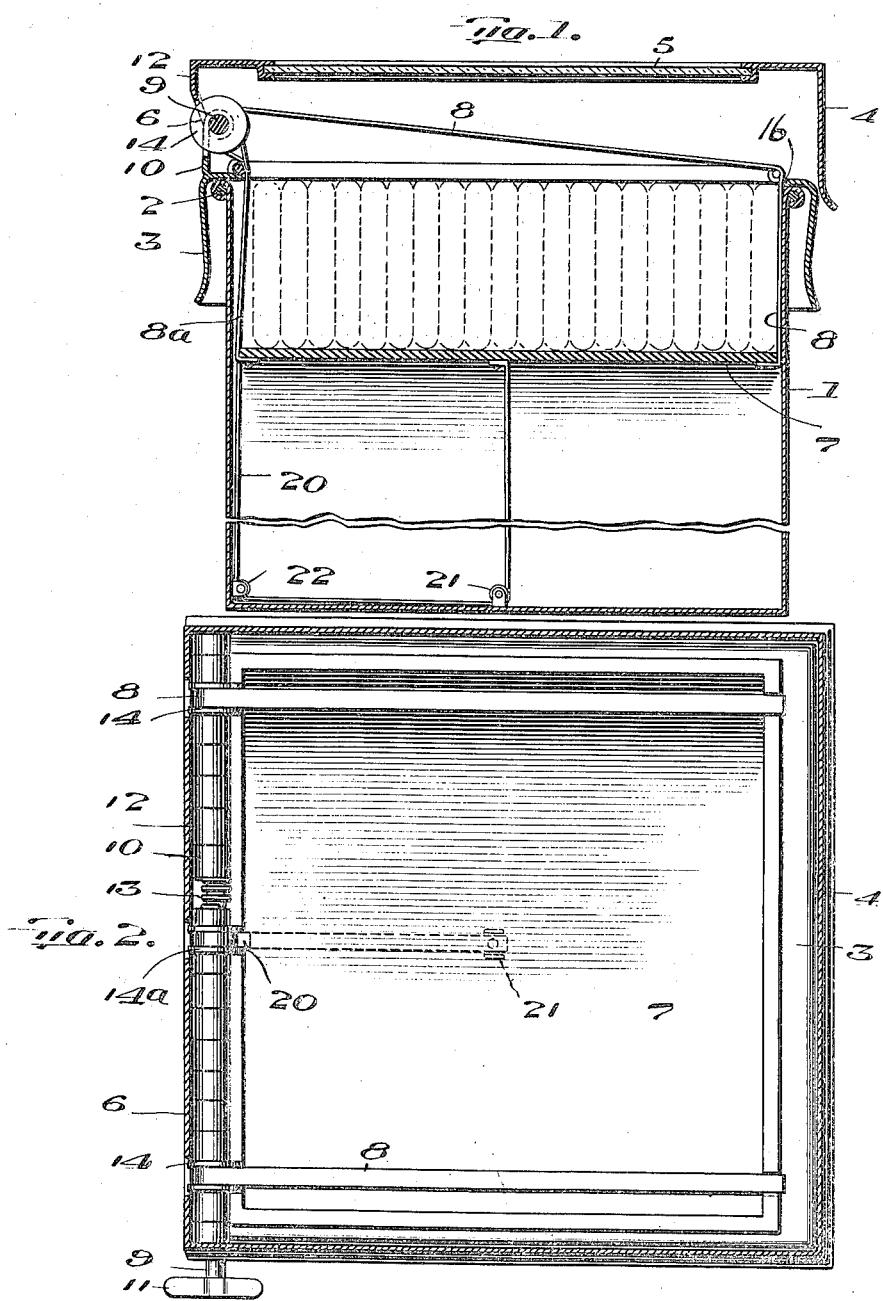
Witnesses
Philip E. Barnes
E. T. Sheely
Inventors
D. F. Cullen
G. T. Martin

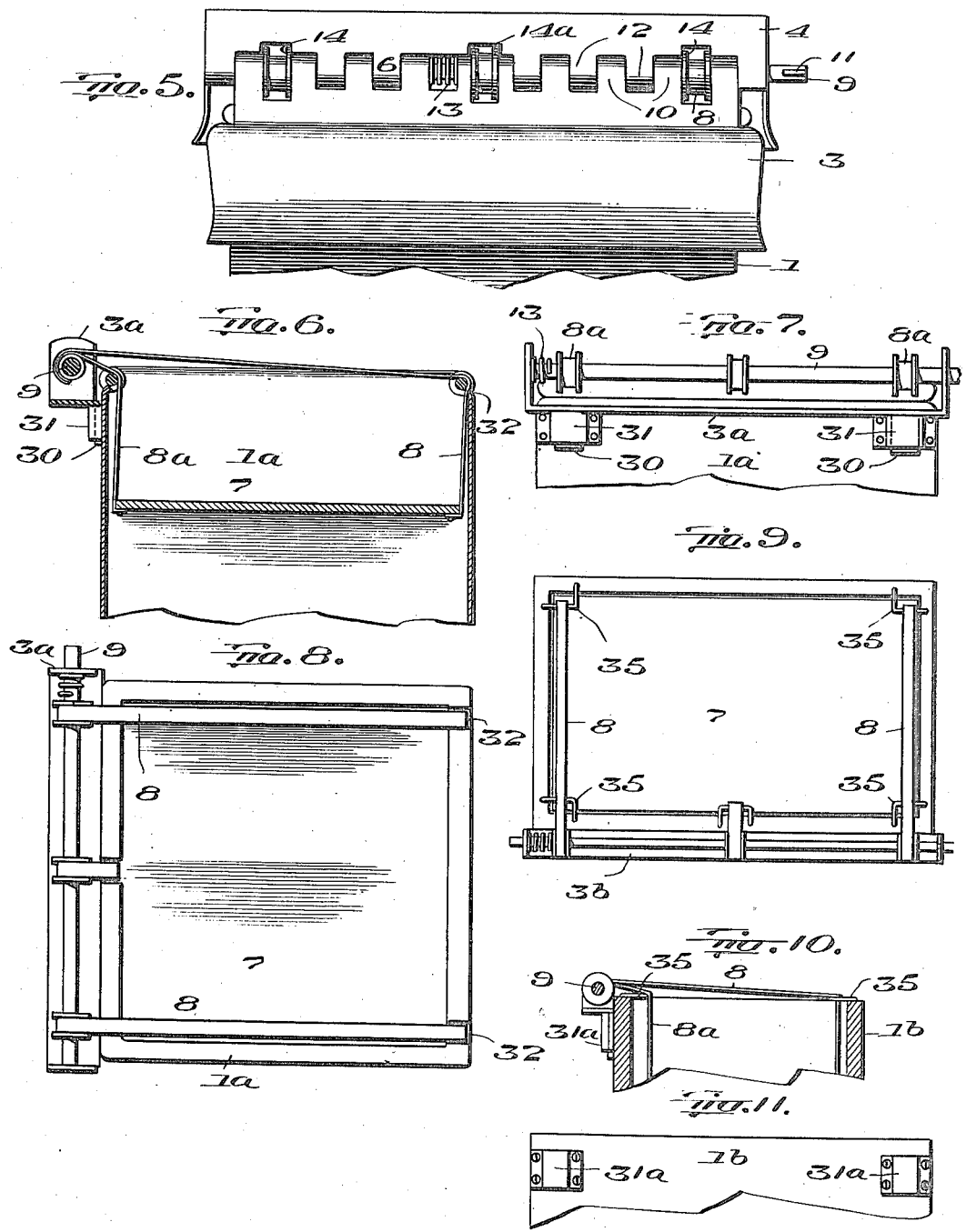

UNITED STATES PATENT OFFICE.

DENNIS F. CULLEN AND GEORGE T. MARTIN, OF WOONSOCKET, RHODE ISLAND.

CRACKER-RECEPTACLE.

1,280,413.   Specification of Letters Patent.   Patented Oct. 1, 1918.

Application filed April 2, 1917. Serial No. 159,202.

*To all whom it may concern:*

Be it known that we, DENNIS F. CULLEN and GEORGE T. MARTIN, citizens of the United States, residing at Woonsocket, in the county of Providence and State of Rhode Island, have invented new and useful Improvements in Cracker-Receptacles, of which the following is a specification.

Our present invention pertains to the retailing of crackers, fancy cookies, cakes and the like.

One of the objects of the invention is the provision of means adapted for use on receptacles, whereby the goods can be maintained at or adjacent to the glass cover usually arranged over the receptacle, this with a view to presenting the goods in an attractive and inviting manner which often has the effect of inducing a purchase.

Another object of the invention is the provision of means whereby the platform on which the goods are raised and maintained in a raised position can be readily lowered in the receptacle as when it is desired to demonstrate the apparatus when cakes or the like are superimposed on the platform in such manner as to preclude injury to the cakes.

Other objects and advantages of the invention will be fully understood from the following description and claims when the same are read in connection with the drawings, accompanying and forming part of this specification, in which:

Figure 1 is a vertical section showing our improvement.

Fig. 2 is a horizontal section through the cover.

Figs. 3 and 4 are detail sections hereinafter specifically referred to.

Fig. 5 is a detail section taken at right angles to Fig. 1 and showing the preferred manner of hinging the cover to the frame.

Fig. 6 is a detail section illustrative of a modification.

Fig. 7 is a detail elevation taken at right angles to Fig. 6.

Fig. 8 is a plan of the same modification.

Fig. 9 is a plan of another modification.

Fig. 10 is a detail section of the same, and Fig. 11 is a detail rear elevation of the receptacle comprised in the last-named modification.

Referring by numerals to the said drawings and more particularly to Figs. 1 to 5 thereof:

1 is a receptacle in the form of a sheet-metal can which is provided with a rod 2 at its top over which the edge of the sheet-metal is turned, and is otherwise, by preference, of the ordinary well-known construction.

3 is a display cover frame that rests over and on the receptacle and has a central opening sufficiently large to afford access to the interior of the receptacle throughout practically all of the transverse area thereof.

4 is a cover, equipped with a pane of glass 5, and hinged at 6 to the frame 3. This cover, in common with the receptacle 1 and the frame 3, is not of our invention, it being the ordinary practice to employ the frame 3 and the cover 4 or similar elements with a view to displaying goods in a box or other receptacle.

In furtherance of our invention a vertically movable platform 7 is disposed in the receptacle 1, and to said platform tapes or other suitable cables 8 are connected; the said tapes being designed to be taken up by means hereinafter described in order to raise the platform and the cakes packed in layers on the same, so that there will always be a layer of cakes adjacent to the top of the receptacle. The platform and tapes occupy but little space in the receptacle, our invention contemplating the laying of the tapes across the goods when the receptacle is packed so that the tapes will be readily accessible for use when the goods are to be placed on sale. Our invention also contemplates leaving the platform and the tapes in the receptacle when the receptacle is discharged of cakes or the like, and the return of the receptacle, the platform and the tapes to the shipper for repeated use. It will also be noted in this connection that the platform and the tapes are susceptible of being readily removed from the receptacle so that all of said parts may be expeditiously and thoroughly cleaned.

In the present and preferred embodiment of our invention, the means for taking up the tapes 8 and raising the platform 7 as well as adjustably maintaining the platform in the positions to which it is elevated, comprises a shaft 9, journaled in brackets 10 on the frame 3 and having a handle 11. This shaft may be and preferably is employed to serve as a pintle in connecting the cover 4 in hinged manner to the frame 3, this construction being both strong and economical. The brackets 10 on frame 3 are spaced apart and turned about the shaft 9, and arranged in lapped relation to said brackets are portions 12 on the cover 4 which are also turned about the shaft 9 as shown best in Fig. 5. A coiled spring 13 is arranged on the shaft 9 and connected at one end thereto, and at its opposite end this spring exerts horizontal pressure against one of the portions 10 on the frame 3, this with a view to preventing casual retrograde turning of the shaft 9 and the consequent gravitation of the platform 7 and the cakes thereon.

Spools 14 are preferably, though not necessarily, provided on the shaft 9 for the winding of the tapes 8, the tapes being detachably connected to the spools and the shaft by removable diametrical pins 15, Figs. 3 and 4.

In practice, when a receptacle charged with cakes or the like and equipped with a platform 7 and tapes 8 is delivered to a retailer, the retailer removes the shipping cover of the receptacle and places on the receptacle the frame 3, equipped as hereinbefore described. He then threads the tapes 8 through the slots 16 in the frame 3, and carries the complementary back tapes $8^a$ up through the opening in frame 3 and connects both sets of tapes to the shaft 9 in position for the winding thereof on the spools 14. As the goods are sold the shaft 9 is turned to wind the tapes 8 and raise the platform 7 so that a layer of the goods will always be adjacent to the top of the receptacle; it being noticed in this connection that the spring 13 will prevent casual downward movement of the platform 7.

In order to permit lowering of the platform 7 when layers of cakes are superimposed on the same I provide in combination with a spool $14^a$ on the shaft 9 the mechanism best shown in Fig. 1. The said mechanism comprises a tape 20 connected to the bottom of the platform 7 and passed downwardly and around a guide 21 on the bottom of the receptacle, and thence to and around another guide 22 located on the bottom of the receptacle near the back wall thereof, and thence up to the spool $14^a$ to which it is connected and upon which it is wound in reverse direction, with reference to the tapes 8. From this it follows that while the platform 7 is being raised through the medium of the tapes 8 the tape 20 will be fed off its complementary spool $14^a$, while when it is desired to lower the platform, the shaft 9 is turned in the direction to take up the tape 20 and feed off the tapes 8 and $8^a$.

The means for lowering the platform 7 is preferably employed for demonstrating purposes and also to place the platform 7 in the bottom of the receptacle after the latter is fully discharged of cakes or the like, but we desire it distinctly understood that when deemed expedient the said lowering means may be altogether omitted without affecting our invention.

In Figs. 6, 7 and 8 we show a simple and inexpensive means for connecting the shaft 9 and its appurtenances to a metallic receptacle $1^a$ in which a platform 7 and tapes 8, $8^a$ are arranged. In this embodiment, the shaft 9 is carried by a frame $3^a$, which frame is provided with lugs 30 which are stepped in brackets 31 on the side of the receptacle $1^a$. In the use of said embodiment the forward tapes 8 are threaded through openings 32 in the forward wall of the receptacle, and the tapes 8 and $8^a$ are connected to the shaft 9 in position to be wound upon the spools in the manner before described, after which the mechanism is operated as and for the purpose before described.

In Figs. 9–11 is shown a modification that involves the use of the invention in conjunction with a wooden cracker box or egg box. In this embodiment the box $1^b$ is provided with brackets $31^a$ on its back wall for the connection of a frame $3^b$ that carries the shaft 9 and its appurtenances, and wire guides 35 are provided in the corners of the box $1^b$ to guide the tapes 8 and $8^a$ which together with the platform 7 are designed to be shipped in the box, the frame $3^b$ being mounted on the box when the goods are placed on sale by the retailer, and the tapes 8 and $8^a$ being threaded past the wire guides 35 and connected to the shaft 9 in the manner and for the purpose before described.

Having described our invention, what we claim and desire to secure by Letters Patent, is:

1. In means for the purpose described, the combination of a receptacle, a platform movable vertically in the receptacle, a shaft supported on the receptacle, cables connected to the platform and to the shaft and arranged upon turning of the shaft to raise the platform, and an auxiliary cable passed through guides in the receptacle and connected to the platform and with the shaft and arranged relative to the shaft reversely with respect to the first-named cable.

2. In means for the purpose described, the combination of a receptacle open at its upper side and having cable guides adjacent to its forward corners and upper end, a frame removably supported on the receptacle, a shaft journaled in said frame, a platform movable vertically in the receptacle, rear cables connected to the platform and with the shaft, and forward cables connected to the platform and with the shaft and passed through the said guides in the receptacle.

3. An apparatus for use in conjunction with open receptacles for cakes and the like, comprising a frame adapted to be removably placed on a receptacle and having a transparent portion adapted to rest above the open receptacle, a platform movable vertically in a receptacle when properly placed therein, a shaft journaled in the frame, and cables connecting the platform and the shaft for raising the former by the latter, whereby articles on the platform may be raised to a plane adjacent to the transparent portion of the frame.

4. In means for the purpose described, a frame adapted to be mounted on a receptacle and having a central opening, a cover hinged to the frame and having a transparent portion, a platform adapted to be moved vertically in the receptacle, platform-raising means carried by the frame, and a connection intermediate the platform and the platform-raising means whereby on actuation of said means the platform will be raised.

5. The combination in means for the purpose described, of a receptacle open at its upper end and having cable guides near its forward corners and upper end and also having brackets on its rear wall, a frame having lugs for arrangement in said brackets, a platform movable in the receptacle, rear cables connecting the platform to a shaft journaled in the frame, the said shaft, and forward cables being threaded through the guides of the receptacle and connecting the platform and the shaft.

6. The combination in means for the purpose described, of a receptacle open at its upper end, wire portions serving in conjunction with the forward corners of the receptacle to form cable guides, brackets on the rear wall of the receptacle, a frame having lugs disposed in said brackets, a shaft journaled in said frame, rear cables connecting the platform and the shaft, and forward cables connecting the platform and shaft and passed through the said guides.

In testimony whereof we have hereunto set our hands in presence of two subscribing witnesses.

DENNIS F. CULLEN.
GEORGE T. MARTIN.

Witnesses:
DANIEL J. LINTON,
EDGAR L. SPAULDING.